E. N. & E. A. FRARY.
GAS CONTROLLING AND IGNITING APPARATUS.
APPLICATION FILED JUNE 16, 1910. RENEWED MAY 23, 1914.
1,123,722.
Patented Jan. 5, 1915.
2 SHEETS—SHEET 1.
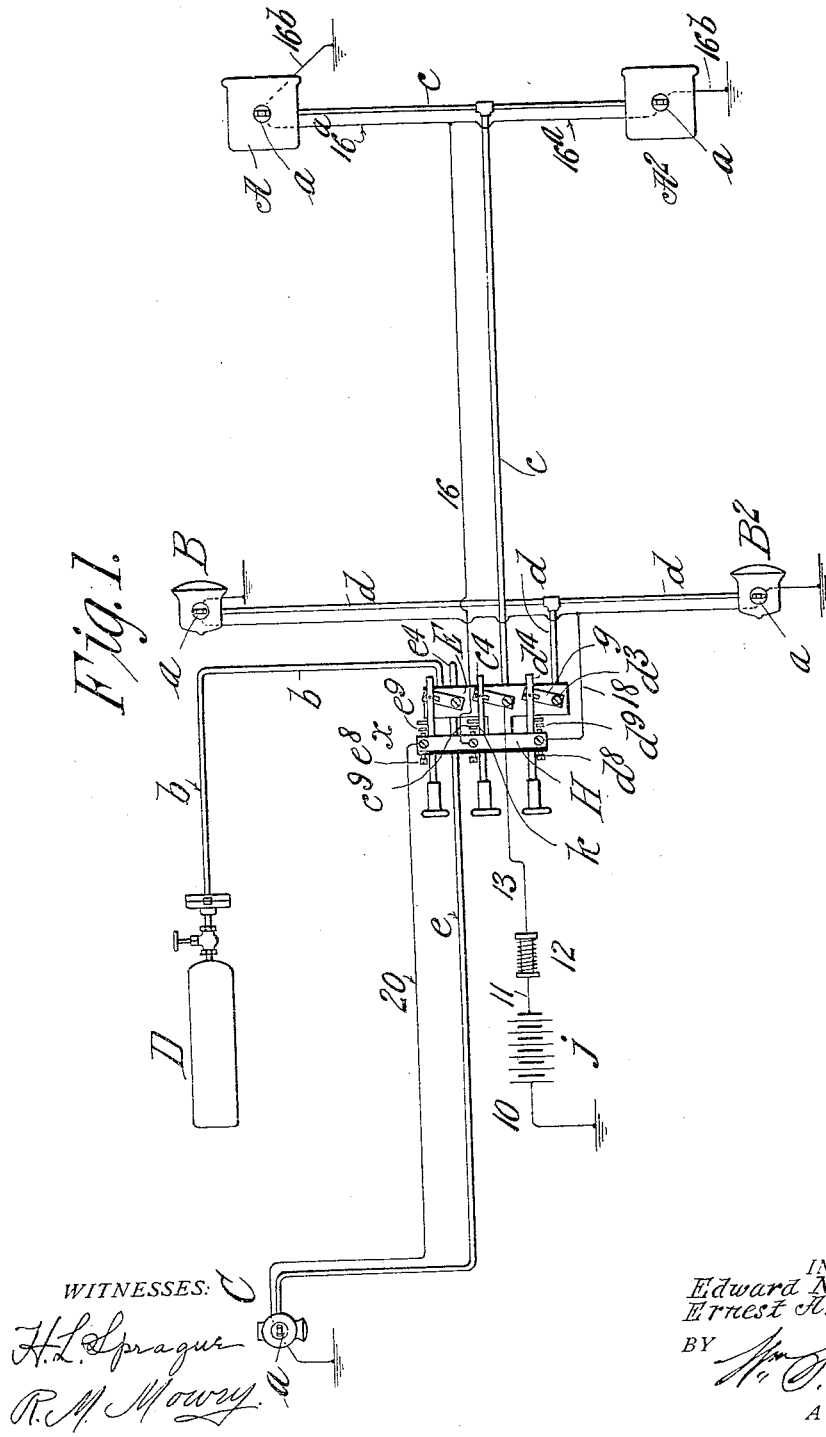
WITNESSES:
H. L. Sprague
R. M. Mowry
INVENTORS,
Edward N. Frary and
Ernest A. Frary,
BY
Wm. S. Bellows
ATTORNEY.

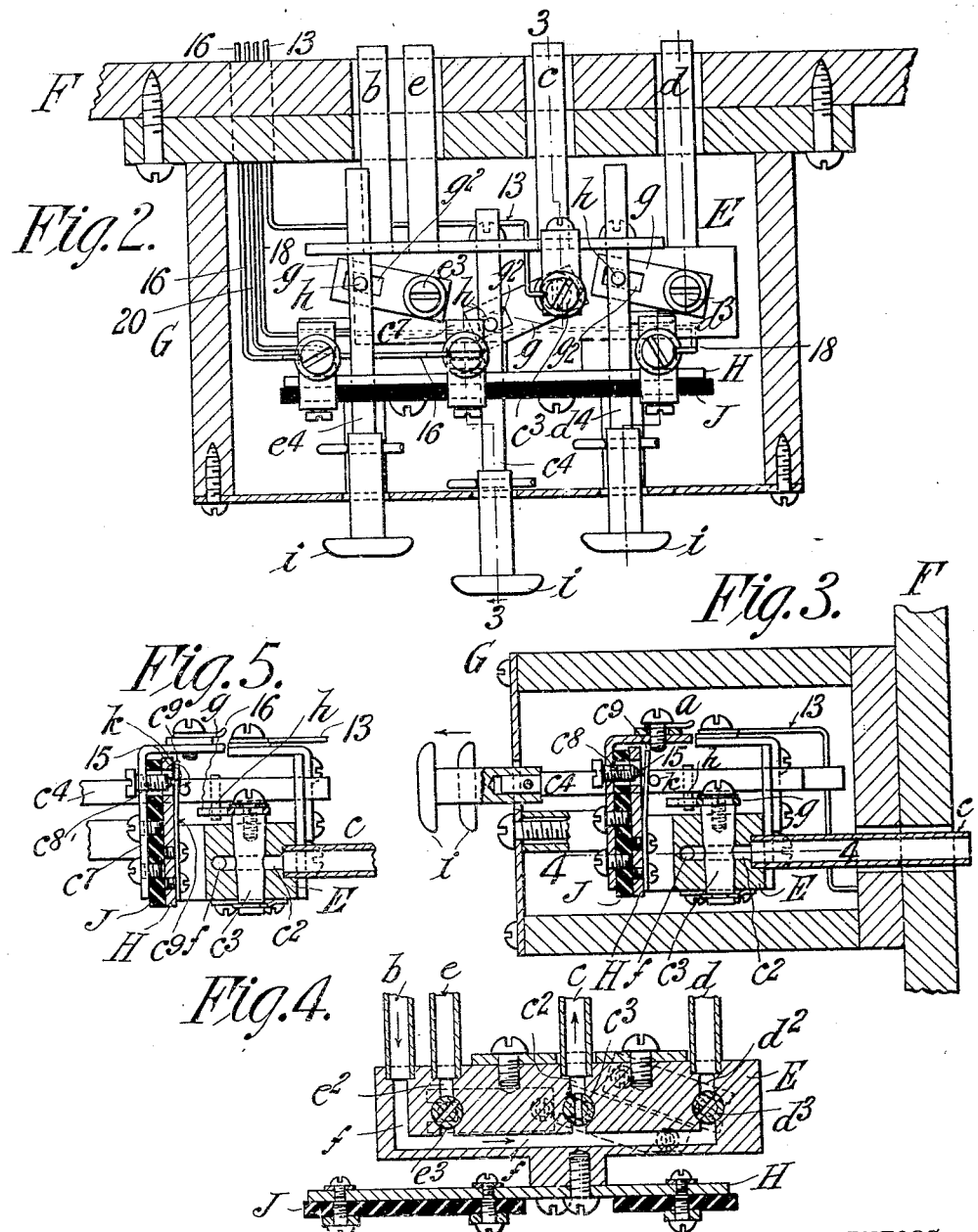

UNITED STATES PATENT OFFICE.

EDWARD N. FRARY AND ERNEST A. FRARY, OF SOUTH DEERFIELD, MASSACHUSETTS.

GAS CONTROLLING AND IGNITING APPARATUS.

1,123,722.  Specification of Letters Patent.  Patented Jan. 5, 1915.

Application filed June 16, 1910, Serial No. 567,183. Renewed May 23, 1914. Serial No. 840,607.

*To all whom it may concern:*

Be it known that we, EDWARD N. FRARY and ERNEST A. FRARY, citizens of the United States of America, and residents of South Deerfield, in the county of Franklin and State of Massachusetts, have invented certain new and useful Improvements in Gas Controlling and Igniting Apparatus, of which the following is a full, clear, and exact description.

This invention relates to improvements in electro-mechanical apparatus employed on automobiles for simultaneously turning on the acetylene or other gas to a burner and establishing a circuit for operating an electric gas lighter, the entire action of the apparatus being controlled by a movable member such as a headed stem or button accessible at the seat of the vehicle so that a person, preparatory to running the automobile in the night may most conveniently, while in position for riding, both turn on the gas to the lamp and secure the lighting thereof.

An object of the invention is the provision of an apparatus comprising parts and devices therein of extreme simplicity, reliability of action, and cheapness of construction so as to insure the simplest manner of manipulation for either turning on the gas to the lamp, lighting the same, or shutting off the flow of gas to the lamp for its extinguishment.

A further object of the invention is to provide as a single equipment advantageously to be mounted on the inside of the dashboard of an automobile, means for controlling the gas supply and electrical lighting devices of the several lamps with which the automobile may be provided.

The invention consists in the combination or arrangement of parts and the construction of certain of the parts all substantially as hereinafter described in conjunction with the accompanying drawings and set forth in the claims.

In the drawings: Figure 1 is a view entirely diagrammatic in its character for indicating in a general way the relative arrangement of the equipments, more especially the lamps, gas supply and conduits leading therefrom to the lamps and the circuit establishing connections for the lighting of the lamps. Fig. 2 is a horizontal sectional view through a portion of the dash-board and the casing within which the controlling devices are inclosed, the latter being shown in plan view. Fig. 3 is a vertical sectional view from front to rear as taken on line 3—3, Fig. 2. Fig. 4 is a horizontal sectional view on line 4—4, Fig. 3. Fig. 5 is a partial sectional view taken on the same plane as Fig. 3, but showing the parts in very slightly different relations as hereinafter explained.

Similar characters of reference indicate corresponding parts in all of the views.

The diagram, Fig. 1, represents an arrangement of the apparatus as embodied in conjunction with or comprising a pair of lamps $A$, $A^2$, as, for instance, those at the extreme front end of an automobile, a pair of lamps $B$, $B^2$, as, for instance, those located at an intermediate part of the machine such as at the front of the dashboard, and a rear or tail light $C$,—each lamp being understood as having a gas burner $a$ appurtenant to which is an electric gas lighting appliance of any of the well known or approved kinds, together with a gas reservoir $D$ having by pipe $b$ a connection into a valve body $E$, such body having leading therefrom a pipe $c$ which connects with the front pair of lamps, a pipe $d$ which connects with the intermediate pair of lamps and a pipe $e$ which connects with the rear lamp $C$,—there being a valve or cock for opening and closing communication between the gas supply pipe $d$ and each one of the lamp connecting pipes $c$, $d$ and $e$ with mechanical means for opening and closing the valve selectively and simultaneously therewith establishing the circuit for operating the electric gas lighter with which each lamp is understood as being equipped.

The several valves or rocks for the burner connecting gas pipes, and means for operating them which concurrently with the operation of a valve establishes a circuit for a lamp, or a pipe-connected pair of lamps, corresponding to which a given valve is provided are represented as having the location at $x$ in Figs. 1 and illustrated as to the mechanical details thereof and as to the provisions for electrical efficiency in Figs. 2 to 5 of the drawings; and referring to the latter figures, F represents the dash board of an automobile, at the rear side of which is a casing G having therein contained the aforementioned body E having a passage $f$ therein with the entrance end of which the gas supplying pipe $b$ connects.

As shown in Fig. 4, branch ways $c^2$, $b^2$, and $e^2$ forwardly lead and have in connection therewith the aforementioned lamp connecting gas pipes $c$, $d$ and $e$; and $c^3$, $d^3$, and $e^3$ represent the cocks or valves which are of a simple form of tapered plug straightway cock, each having a ground fit in a circular tapered opening therefor in the metallic body E; and the locations of these cocks are represented by the same references $c^3$, $d^3$ and $e^3$ in the plan view, Fig. 2.

Each plug valve has an operating lever $g$, provided with a slot $g^2$, such lever overlying the top of the metallic body for the pluralized valves; and in conjunction with each of the valves is a stem $c^4$, $b^4$ and $e^4$, the same playing in ways therefor, suitably provided for the horizontal movements, rearwardly and forwardly, over the valve operating levers, in the slots $g^2$ of which levers depending studs $h$ of the said stems have lost-motion engagements by reason of the diameter of each of the studs or pins $h$ being slightly less than the width of the slot or recess in the valve lever in which it engages. The purpose of this lost motion engagement, which is comparatively important, will be hereinafter fully explained. Of course, it is clearly understood that when a stem is rearwardly drawn, as the one $c^4$ is represented, manually, by grasping the button or head $i$, the resulting swinging movement of the particular one of the levers $g$ which the stud or the stem engages, will cause such partial rotary movement of the valve as to open the latter, while, on the other hand, the pushing forward of the button provided stem will cause a closing of the valve.

Now, referring to the electrical gas lighting appliances, $j$ represents a battery, the wire 10 connected therewith at one end being grounded in some metallic part of the automobile; and from the other end of the battery the wire 11 has connection in a spark coil 12, and the wire 13, which may be, in conjunction with the wire portion 11 regarded as the "line wire," has connection with the metallic valve body E.

On the front of the valve body E and in metallic connection therewith is a vertically standing brass or other metallic plate, and mounted on its rear face is a plate or block J of insulating material; and in proximity to the valve stem $c^4$ is a plate, $c^7$, through and in metallic connection with which passes a screw $c^8$, the inner end of which passes freely through and without contact with the walls of an aperture in the aforementioned metallic plate H, and for contacting with the inner end of the screw or contact member $c^8$ is a flat spring plate or tongue $c^9$, particularly represented in Figs. 3 and 5, such plate having a teat 15 at its side toward the end of the contact screw $c^8$, for insuring a positive contacting between the said parts $c^9$ and $c^8$,—it, furthermore, being particularly noted that the shank portion of the spring plate is directly secured to the metallic plate H, which, as manifest, is in effect a continuation of the line wire. The aforementioned plate $c^7$, which is here represented as of angular form, and forms a metallic continuation of the contact screw $c^8$, receives connection therewith of a wire 16, which by branches $16^a$, $16^a$, extend to the electric gas lighting devices located at $a$ $a$ coincident with the locations of the pairs of lamps at the extreme front of the machine,—the wires $16^b$, $16^b$, thence running from the gas lighting devices to metallic connections with any suitable portions of the automobile, as the frame thereof. The aforementioned spring plate $c^9$ is by its natural resilient character normally forward of and separated from contact piece $c^8$ with which it coacts as represented in Fig 3, but so soon as such spring plate is in closed relation to and in actual bearing against the contact piece $c^8$, the circuit will be closed or established for the passage of the current from the battery and spark coil by way of the wire 13 and metallic valve body to the spring plate $c^9$ and thence through the contact screw $c^8$, plate $c^7$ and wire 16 and its branches to and through the gas lighters at $a$ $a$, the current grounded in the metallic frame of the machine returning to the battery by way of the frame connected wire 10.

The same means for opening the valve $c^3$ which controls the passage of gas through the pipe $c$ which is connected with the lamps at $a$ $a$, is instrumental for effecting the movement of the spring plate $c^9$ against the contact piece $c^8$ for the establishment of the gas lighting circuit, that is to say, the stem $c^4$ has just forward of the plate $h$ and forward of the spring tongue or thin plate $c^9$ a stud $k$ which has a position transversely of and for engaging the said spring plate so that when the stem is rearwardly drawn to cause an opening of the passage from the gas supply pipe $b$ through the valve body to the forward lamp, the spring plate will be brought to contact against its companion member $c^8$, closing the circuit.

It has not been herein deemed necessary or desirable to illustrate otherwise than diagrammatically, as done in Fig. 1, any particular description of electric gas lighting device, such being understood as of the jump spark class, and one of the very many varieties of well known electric gas lighters may be selected for employment in conjunction with the gas burner. But it is to be here particularly pointed out as new in this apparatus, and as important, that so soon as the stem is drawn forward and the current made for operating the electric gas lighter forming part of the gas burner, and the stem is then released from the draft manually imparted thereto, the contact spring $c^9$ will be permitted to react and become separated or opened from the contact piece $c^8$ so that there will be no further continuance of the circuit in closed condition to run down the battery; and this effect is permitted because of the width of the slot or aperture $g^2$ in the valve operating lever being wider than the diameter of the stud $h$ carried by the stem, and which stud engages in the said slot. So soon as the forward draft on the stem is released, the stud which had bearing against the forward boundary of the slot will without any closing effect on the valve lever, move to the rear of the slot as impelled by the reaction of the contact spring $c^9$, the power of which spring, however, and the extent of its throw being insufficient to impart any valve closing movement to the lever.

The devices which have been described in detail and pointed out by reference letters in Figs. 3 and 5, as constituting the means for closing a circuit for operating the gas lighting burner of the forward set of lamps concurrently with the opening of the valve controlling the gas pipe for such set of lamps, is duplicated for the provision of corresponding means appurtenant to the other sets of lamps and the valves controlling the gas pipe leading thereto; and in this connection it is sufficient to say that a wire 18, like the wire 16, runs from the metallic plate H to the gas lighting burners of the intermediate pair of lamps B, B², such wire having connection with the contact piece $d^8$ coacting with which is a contact spring $d^9$ engaged by the stud $k$ on the stem $d^4$ which coacts with the lever $c$ for the valve $d^3$ provided for opening and closing the gas pipe $b$; and 20 represents a wire similarly provided in conjunction with the contact piece $e^8$, which is companion to the circuit closing contact spring $e^9$ operated by the stem $e^4$ to close the circuit for the rear lamp C concurrently with the opening of the gas pipe valve $e^3$ of the rear lamp gas pipe $e$.

A representation of the extension of the means for controlling the gas supply and the ignition of the same for more than one set of lamps is here given principally to show the comparative simplicity of the equipments which are ample and efficient for the maximum requirements on an automobile, the mere reduplication of the gas controlling and lighting devices for one set of lamps being carried out in a manifest way to the extent of the requirements therefor.

In Fig. 1, the pipe $b$ leading from the receptacle D for the acetylene or other gas is provided with a reducing valve conventionally represented at $m$ and which is a provision of great advantage in an apparatus of a kind to which this invention pertains in that a uniform supply of gas is delivered through the controller to the lamps.

We claim:—

1. The combination with a valve body, of a valve located therein having an operating lever arm, a metallic plate provided with a body of insulating material on one side thereof, said body and plate having a hole therethrough, said plate having a spring contact plate mounted thereon and lying opposite said hole, and normally reactive to have a receding movement from the plate, a contact piece extending through said hole and terminating adjacent said spring plate, a headed stem having lost motion engagement with the valve operating lever arm, and studs upon said headed stem for engaging said spring contact plate.

2. In a device of the character described, the combination with a valve body of a valve located therein and having an operating lever arm, an operating stem having lost motion engagement with said lever arm, a resilient contact plate, a contact piece and means carried by the operating stem for engaging the contact plate and moving it toward the contact piece when the operating stem is moved to open the valves.

3. In a device of the character described, the combination with a valve therein, an operating lever arm connected to said valve, an operating stem having a lost motion engagement with said lever arm, a fixed contact piece and a projection upon the operating stem for moving the contact plate against its tension toward the fixed contact piece when the operating stem is moved to open the valve.

Signed by us at Springfield, Mass., in presence of two subscribing witnesses.

EDWARD N. FRARY.
ERNEST A. FRARY.

Witnesses:
G. R. DRISCOLL,
WM. S. BELLOWS.

Copies of this patent may be obtained for five cents each, by addressing the "Commissioner of Patents, Washington, D. C."